United States Patent
Fujiyama et al.

(10) Patent No.: US 6,803,807 B2
(45) Date of Patent: Oct. 12, 2004

(54) NEGATIVE VOLTAGE OUTPUT CHARGE PUMP CIRCUIT

(75) Inventors: Toshiya Fujiyama, Yamatokouriyama (JP); Masanori Inamori, Tenri (JP); Hiroki Doi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/358,189

(22) Filed: Feb. 5, 2003

(65) Prior Publication Data

US 2003/0151448 A1 Aug. 14, 2003

(30) Foreign Application Priority Data

Feb. 12, 2002 (JP) ........................................ 2002-033340

(51) Int. Cl.[7] ............................. G05F 1/10; G05F 3/02
(52) U.S. Cl. ........................................ 327/536; 327/589
(58) Field of Search ................................. 327/536, 589; 363/59–60; 365/226

(56) References Cited

U.S. PATENT DOCUMENTS 4,433,253 A * 2/1984 Zapisek ....................... 327/536
5,952,860 A * 9/1999 van Saders et al. .......... 327/219

* cited by examiner

Primary Examiner—Quan Tra
(74) Attorney, Agent, or Firm—Birch, Stewart, Kolasch & Birch, LLP

(57) ABSTRACT

In a negative voltage output charge pump circuit, first a capacitor C1 is charged with a positive voltage Vin relative to a reference voltage, and then the high-potential terminal A of the capacitor C1 is made to conduct to the reference voltage and simultaneously the low-potential terminal B of the capacitor C1 is made to conduct to an output terminal OUT so that the voltage with which the capacitor C1 is charged is output as a negative voltage −Vin. Here, at least one of the switching device DP1 that is kept on while the capacitor C1 is being charged so as to apply the reference voltage to the point B and the switching device DP2 that is kept on while the negative voltage is being output so as to make the point B conduct to the output terminal OUT is a depletion-type transistor. This configuration makes it possible to realize a negative voltage output charge pump circuit that is free from malfunctioning caused by a parasitic device, that operates with low loss, and that can be produced at low costs.

9 Claims, 3 Drawing Sheets

NEGATIVE VOLTAGE OUTPUT CHARGE PUMP CIRCUIT

This nonprovisonal application claims priority under 35 U.S.C. §119 (a) on Patent Application No. 2002-033340 filed in JAPAN on Feb. 12, 2002, which is herein incorporated by reference.

BACKGROUND OF THE INVENTION

1. Field of the Invention

The present invention relates to a negative voltage output charge pump circuit that generates from an input voltage a negative voltage for output.

2. Description of the Prior Art

FIG. 5 is a circuit diagram showing an example of a conventional negative voltage output charge pump circuit. The negative voltage output charge pump circuit 1a shown in this figure is so configured that, as a PMOS transistor P1 and NMOS transistors N1, N2, and N3 (all of the enhancement type) acting as switching devices are periodically turned on and off according to control signals S1 and S2, a first capacitor C1 is charged with an input voltage Vin fed in via an input terminal IN, and then the voltage charged in the first capacitor C1 is fed out as a negative voltage −Vin via an output terminal OUT.

Now, how a negative voltage is output in the configuration described above will be described in more detail. First, the control signals S1 and S2 are fed in so that the PMOS transistor P1 and the NMOS transistor N1 are turned on and the NMOS transistors N2 and N3 are turned off. When these control signals S1 and S2 are fed in, the input voltage Vin is applied to one end (the point A) of the first capacitor C1, and the ground potential is applied to the other end (the point B) of the first capacitor C1. Thus, the first capacitor C1 is charged until the potential difference between its terminals becomes equal to the input voltage Vin.

After completion of the charging of the first capacitor C1, the logical levels of the control signals S1 and S2 are so switched that the PMOS transistor P1 and the NMOS transistor N1 are turned off and the NMOS transistors N2 and N3 are turned on. As a result of this switching, the point A conducts through the NMOS transistor N3 to a ground terminal GND, and thus the potential at the point A drops from the level of the input voltage Vin to the ground potential.

Here, as a result of the charging, between the terminals of the first capacitor C1 appears a potential difference equal to the input voltage Vin, and therefore, when the above-mentioned drop in the potential at the point A occurs, the potential at the point B drops from the ground potential to a negative voltage −Vin. At this time, the point B conducts through the NMOS transistor N2 to the output terminal OUT, and therefore the electric charge in a second capacitor C2 moves to the first capacitor C1. As a result, the potential at the output terminal OUT drops to the negative voltage −Vin.

In a configuration like the one described above in which MOS transistors are used as switching devices, it is generally necessary to secure a backgate potential for the MOS transistors. The backgate potential of a MOS transistor needs to be lower than its channel potential. This is because, if the backgate potential of a MOS transistor is higher than its channel potential, a PN diode is formed between the backgate and the channel, and permits a current to flow from the backgate to the channel, causing malfunctioning.

For example, in a case where the negative voltage output charge pump circuit 1a configured as described above is formed on a p-type substrate so as to have a twin-well structure, all the NMOS transistors N1, N2, and N3 are formed on the p-type substrate. Thus, the substrate potential itself serves as the backgate potential. In this case, for the reason mentioned above, the p-type substrate needs to be biased at the lowest potential within the circuit so that the substrate potential is lower than the channel potential of the NMOS transistors N1, N2, and N3.

Here, the lowest potential within the circuit is the potential at the point B as observed when the negative voltage −Vin is generated at the output by the charge in the first capacitor C1. However, when the first capacitor C1 is in the process of being charged, the potential at the point B is equal to the ground potential. That is, the potential at the point B is not always the lowest. Accordingly, in the negative voltage output charge pump circuit 1a configured as described above, the backgates of the NMOS transistors N1, N2, and N3 are connected to the output terminal OUT, at which the negative voltage −Vin is present all the time.

It is true that the negative voltage output charge pump circuit 1a configured as described above outputs the desired negative voltage −Vin without the risk of malfunctioning in which currents flow from the backgates of the NMOS transistors to their channels.

However, the negative voltage output charge pump circuit 1a configured as described above requires extra operation to bias the p-type substrate at the lowest potential (the negative voltage −Vin at the output terminal OUT) within the circuit. This leads to increased loss of electric power.

Moreover, the negative voltage output charge pump circuit 1a configured as described above is prone to malfunctioning caused by a parasitic NPN-type multiple-collector transistor. FIG. 6 is a vertical sectional view showing an outline of the structure of the negative voltage output charge pump circuit 1a formed on a p-type substrate so as to have a twin-well structure.

As shown in this figure, the parasitic NPN-type transistors Q1 has its emitter at the point B, has its base at the p-type substrate SUB, and has its collectors at the n-type well of the PMOS transistor P1 and the source of the NMOS transistor N1.

When the potential at the output terminal OUT and the potential at the p-type substrate SUB are made low, the potential at the point B, which is the emitter of the parasitic NPN-type transistors Q1, drops to the level of the negative voltage −Vin. At this time, the p-type substrate SUB, which is the base of the parasitic NPN-type transistors Q1, is at the ground potential. Accordingly, the base-emitter section of the parasitic NPN-type transistors Q1 is forward-biased, permitting a current to flow from the collector to the emitter.

When this unintended current flows to the point B, it captures the electric charge that is supposed to be fed to the first capacitor C1 to generate the negative voltage −Vin. As a result, neither the potential at the p-type substrate SUB nor the potential at the output terminal OUT drops, and thus no negative voltage is generated. This is because the current that flows from the p-type substrate SUB to the point B corresponds to the base current of the parasitic NPN-type transistors Q1, and thus hfe times that current flows to the point B. Moreover, the potential at the n-type well W, which is one of the multiple collectors of the parasitic NPN-type transistors Q1, is higher than the potential at the output terminal OUT and the potential at the p-type substrate SUB, and this causes an accordingly large current to flow to the point B.

The above-described malfunctioning caused by the parasitic NPN-type transistors Q1 can be overcome by replacing the NMOS transistors N1 and N2, to which a negative voltage is applied, both with PMOS transistors.

FIG. 7 is a circuit diagram showing another example of a conventional negative voltage output charge pump circuit. When the negative voltage output charge pump circuit 1b shown in this figure is formed on a p-type substrate so as to have a twin-well structure, PMOS transistors P1, P2, and P3 are formed on an n-type well electrically separated from the p-type substrate, and the backgate of the n-type well is connected to a potential higher than that of its channel (in the figure, to the input voltage Vin).

It is true that the negative voltage output charge pump circuit 1b configured as described above causes no serious problem even when the potential at the above-mentioned channel drops to the level of the negative voltage −Vin, so long as it is designed to stand such a potential. Moreover, it is not necessary to lower the substrate potential to the level of the negative voltage −Vin as in the negative voltage output charge pump circuit 1a.

However, in the negative voltage output charge pump circuit 1b configured as described above, its circuit configuration does not permit the gate voltage of the PMOS transistors P2 and P3 to be made lower than their drain voltage. Thus, when the PMOS transistors P2 and P3 are turned on, their lowest drain-source voltage is equal to their drain-gate voltage, i.e., their threshold voltage.

Let the above-mentioned threshold voltage be Vth. Then, the output voltage is equal to −(Vin−2Vth), which means a voltage loss of 2Vth. For example, when Vin=3 V and Vth=0.7 V, the voltage that appears at the output terminal OUT is as low as −1.6 V. In this way, while the negative voltage output charge pump circuit 1b configured as described above is free from malfunctioning caused by a parasitic device, it suffers from increased loss of electric power.

SUMMARY OF THE INVENTION

An object of the present invention is to provide a negative voltage output charge pump circuit that is free from malfunctioning caused by a parasitic device, that operates with low loss, and that can be produced at low costs.

To achieve the above object, according to the present invention, a negative voltage output charge pump circuit is provided with: a capacitor that, while being charged, receives, at one end thereof, a reference voltage and receives, at the other end thereof, a positive voltage relative to the reference voltage and that, while being discharged, has that other end thereof conducting to the reference voltage and has that one end thereof conducting to an output terminal; a first switching device that is kept on while the capacitor is being charged so as to apply the reference voltage to that one end of the capacitor; and a second switching device that is kept on while the capacitor is being discharged so as to make that one end of the capacitor conduct to the output terminal. Here, at least one of the first and second switching devices is of the depletion type.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 5:
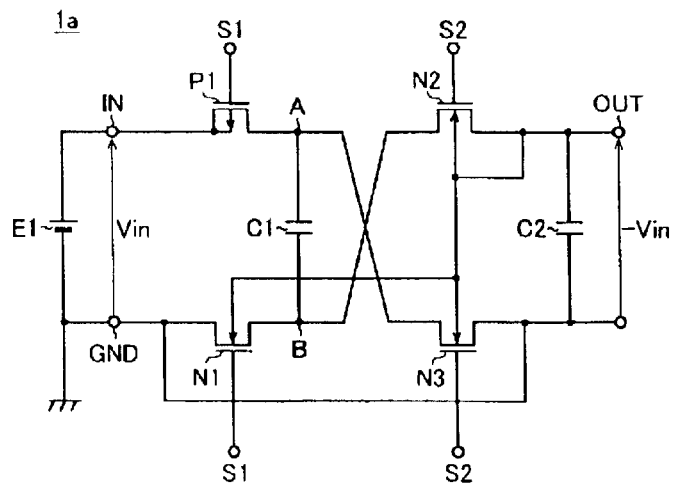
FIG. 5 is a circuit diagram of an example of a conventional negative voltage output charge pump circuit.
Figure 6:
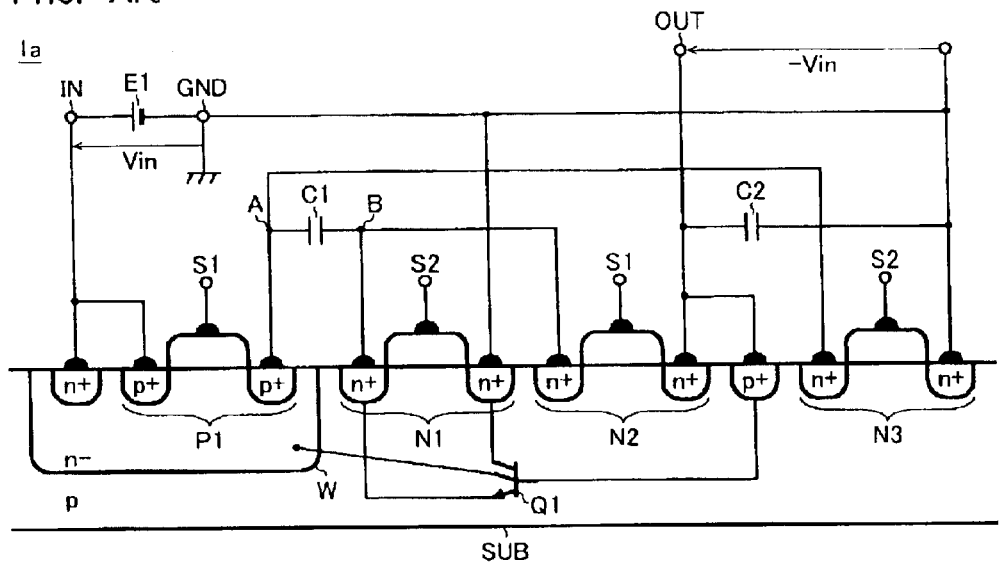
FIG. 6 is a vertical sectional view showing an outline of the structure of the negative voltage output charge pump circuit 1a formed on a p-type substrate so as to have a twin-well structure.

In the negative voltage output charge pump circuit 1b (see FIG. 7), which is a version of the negative voltage output charge pump circuit 1a (see FIG. 5) in which the NMOS transistors N1 and N2 are both replaced with PMOS transistors P2 and P3, increased loss of electric power results from the use of enhancement-type PMOS transistors as the PMOS transistors P2 and P3. With this fact in mind, the present invention has been devised.

Figure 1:
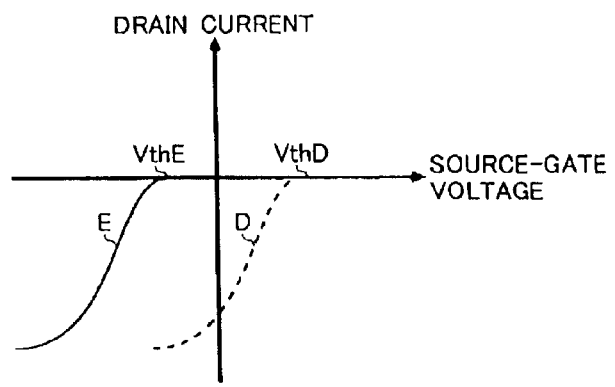
FIG. 1 is a diagram showing the electrical characteristic of an enhancement-type PMOS transistor and that of a depletion-type PMOS transistor.

As is well known, there are two types of MOS transistor, namely those of the enhancement type and those of the depletion type. FIG. 1 shows the electric characteristic of an enhancement-type PMOS transistor and that of a depletion-type PMOS transistor. In the figure, the source-gate voltage is taken along the horizontal axis, and the drain current is taken along the vertical axis. The solid line E represents the electric characteristic of an enhancement-type PMOS transistor, and the broken line D represents that of a depletion-type PMOS transistor.

As will be understood from this figure, to turn an enhancement-type PMOS transistor on, it is necessary to make the gate potential lower than the source potential by a threshold voltage VthE; to turn it off, the source-gate voltage is made not higher than the threshold voltage VthE. On the other hand, a depletion-type PMOS transistor is normally on, and therefore it is on even when the source-gate voltage is equal to 0 V; to turn it off, it is necessary to make the gate potential higher than the source potential by a threshold voltage VthD.

Figure 7:
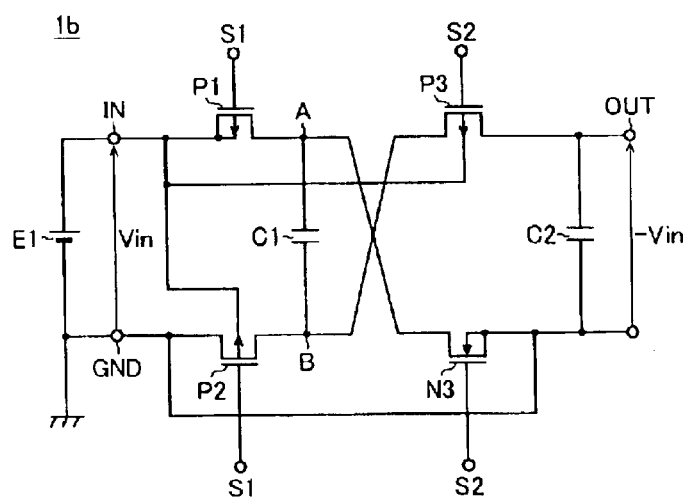
FIG. 7 is a circuit diagram of another example of a conventional negative voltage output charge pump circuit.

From these facts, it will be understood that, by using depletion-type PMOS transistors instead of enhancement-type PMOS transistors as the PMOS transistors P2 and P3 in the negative voltage output charge pump circuit 1b shown in FIG. 7, it is possible to make the lowest drain-source voltage as observed when the PMOS transistors P2 and P3 are on equal to 0 V, and thereby reduce the loss of electric power inevitable in the conventional configuration. Of course, compared with the negative voltage output charge pump circuit 1a employing NMOS transistors, here it is not necessary to make the substrate potential drop to a negative voltage, and there is less risk of malfunctioning caused by a parasitic device.

Figure 2:
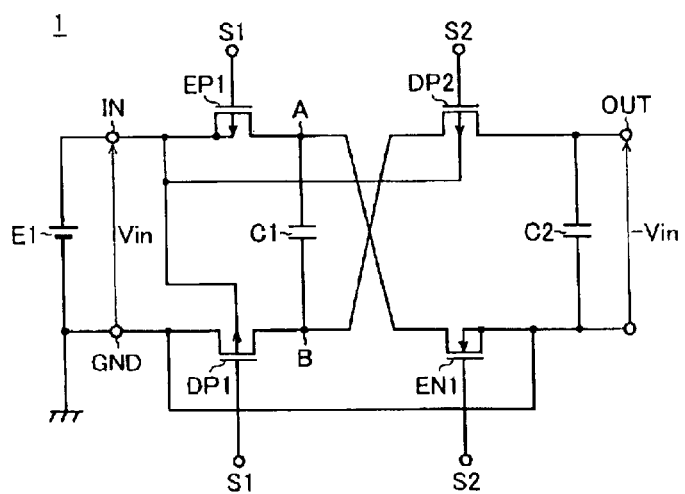
FIG. 2 is a circuit diagram of an example of a negative voltage output charge pump circuit embodying the invention.

FIG. 2 is a circuit diagram showing an example of a negative voltage output charge pump circuit embodying the invention. The negative voltage output charge pump circuit 1 shown in this figure employs, as switching devices, an enhancement-type PMOS transistor EP1 (hereinafter the E-PMOS transistor EP1), depletion-type PMOS transistors DP1 and DP2 (hereinafter, the D-PMOS transistors DP1 and DP2), and an enhancement-type NMOS transistor EN1 (hereinafter the E-NMOS transistor EN1). These transistors are periodically turned on and off according to control signals S1 and S2 so that a first capacitor C1 is charged with an input voltage Vin fed in via an input terminal IN and then the voltage with which the first capacitor C1 is charged is fed out as a negative voltage −Vin via an output terminal OUT.

A direct-current source E1 is connected between the input terminal IN and a ground terminal GND so that an input voltage Vin is applied to the input terminal IN relative to the ground terminal GND. The source of the E-PMOS transistor EP1 is connected to the input terminal IN, and the drain of the E-PMOS transistor EP1 is connected to one end (the point A) of the first capacitor C1 and to the drain of the E-NMOS transistor EN1.

The drain of the D-PMOS transistor DP1 is connected to the ground terminal GND, to the source of the E-NMOS transistor EN1, and to one end of a second capacitor C2. The source of the D-PMOS transistor DP1 is connected to the other end (the point B) of the first capacitor C1 and to the drain of the D-PMOS transistor DP2. The source of the D-PMOS transistor DP2 is connected to the other end of the second capacitor C2 and to the output terminal OUT.

A control signal S1 is fed to the gates of the E-PMOS transistor EP1 and the D-PMOS transistor DP1, and a control signal S2 is fed to the gates of the D-PMOS transistor DP2 and the E-NMOS transistor EN1. The back-gates of the E-PMOS transistor EP1 and the D-PMOS transistors DP1 and DP2 are connected to the input terminal IN, and the backgate of the E-NMOS transistor EN1 is connected to the ground terminal GND.

In this way, the four transistors constituting the negative voltage output charge pump circuit 1 are grouped into two pairs, and the logical levels of the control signals S1 and S2 are so controlled as to be always opposite to each other so that the transistors belonging to the same pair are turned on or off simultaneously and that the transistors belonging to different pairs are not turned on or off simultaneously.

The purpose of giving the control signals S1 and S2 opposite logical levels is to prevent malfunctioning such as short-circuiting of the input terminal IN with the ground terminal GND and short-circuiting of the negative voltage −Vin generated in the first capacitor C1 with the ground voltage GND. As the case may be, a delay circuit may be added to delay the timing with which one of the control signals S1 and S2 turns the transistors from off to on.

Figure 3:
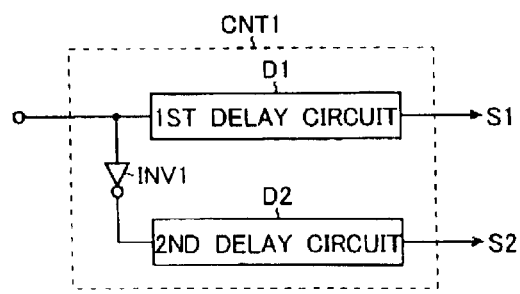
FIG. 3 is a block diagram of an example of the control circuit for generating the control signals S1 and S2.

FIG. 3 is a block diagram of an example of the control circuit for generating the control signals S1 and S2. In this embodiment, the control circuit CNT1 produces the control signals S1 and S2 by splitting a single control signal into two signals and then inverting one of them with an inverter circuit INV1. The control circuit CNT1 further has a first and a second delay circuit D1 and D2 in the output paths of the control signals S1 and S2, respectively.

The provision of the first and second delay circuits D1 and D2 in the control circuit CNT1 prevents all the transistors from being turned on simultaneously when they are turned on or off. This helps improve the stability of operation.

Now, how the negative voltage output charge pump circuit 1 configured as described above outputs a negative voltage will be described more specifically. First, the control signals S1 and S2 are fed in so that the E-PMOS transistor EP1 and the D-PMOS transistor DP1 are turned on and the D-PMOS transistor DP2 and the E-NMOS transistor EN1 are turned off. When the control signals S1 and S2 are so fed in, the input voltage Vin is applied to one end (the point A) of the first capacitor C1, and the ground voltage is applied to the other end (the point B) of the first capacitor C1.

At this time, the gate potential of the D-PMOS transistor DP1, which makes the point B conduct to the ground terminal GND, cannot be made lower than its drain potential, i.e., the ground potential. However, since the D-PMOS transistor DP1 is of a depletion type, its drain-source voltage does not produce so much loss as the voltage (the source-gate potential difference) produced when an enhancement-type transistor is used. Accordingly, the first capacitor C1 is charged until the potential difference between its terminals becomes almost equal to the input voltage Vin.

After completion of the charging of the first capacitor C1, the logical levels of the control signals S1 and S2 are so switched that the E-PMOS transistor EP1 and the D-PMOS transistor DP1 are turned off and the D-PMOS transistor DP2 and the E-NMOS transistor EN1 are turned on. As a result of this switching, the point A conducts through the E-NMOS transistor EN1 to the ground terminal GND, and thus the potential at the point A drops from the level of the input voltage Vin to the ground potential.

Here, as a result of the charging, between the terminals of the first capacitor C1 appears a potential difference equal to the input voltage Vin, and therefore, when the above-mentioned drop in the potential at the point A occurs, the potential at the point B drops from the ground potential to a negative voltage −Vin. At this time, the point B conducts through the D-PMOS transistor DP2 to the output terminal OUT, and therefore the electric charge in the second capacitor C2 moves to the first capacitor C1.

Here, the gate potential of the D-PMOS transistor DP2, which makes the point B conduct to the output terminal OUT, cannot be made lower than its drain potential, i.e., the negative voltage −Vin. However, since the D-PMOS transistor DP2 is of a depletion type, its drain-source voltage does not produce so much loss as the voltage (the source-gate potential difference) produced when an enhancement-type transistor is used. Accordingly, the potential at the output terminal OUT drops to almost the level of the negative voltage −Vin.

Figure 4:
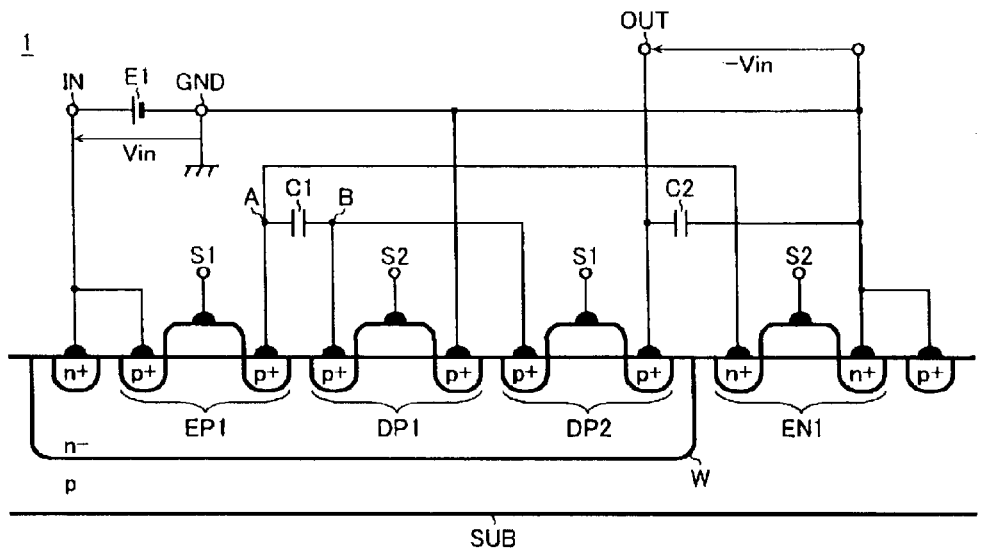
FIG. 4 is a vertical sectional view showing an outline of the structure of the negative voltage output charge pump circuit 1 formed on a p-type substrate so as to have a twin-well structure.

FIG. 4 is a vertical sectional view showing an outline of the structure of the negative voltage output charge pump circuit 1 formed on a p-type substrate so as to have a twin-well structure. As shown in this figure, when the negative voltage output charge pump circuit 1 is formed on a p-type substrate so as to have a twin-well structure, the E-PMOS transistor EP1 and the D-PMOS transistors DP1 and DP2 are formed on an n-type well W that is electrically separated from the p-type substrate SUB, and the backgate of the n-type well W is connected to a potential higher than that of its channel (in this embodiment, to the input voltage Vin).

Thus, the negative voltage output charge pump circuit 1 configured as described above causes no serious problem even when the potential at the above-mentioned channel drops to the level of the negative voltage −Vin, so long as it is designed to stand such a potential. Moreover, it is not necessary to lower the substrate potential to the level of the negative voltage −Vin as in the conventional negative voltage output charge pump circuit 1a.

It is to be understood that the present invention applies not only to the circuit configuration specifically described above as an embodiment but also to any negative voltage output charge pump circuit configured in a similar manner.

As described above, according to the present invention, in a negative voltage output charge pump circuit in which first a capacitor is charged with a positive voltage relative to a reference voltage and then the high-potential terminal of the capacitor is made to conduct to the reference voltage and simultaneously the low-potential terminal of the capacitor is made to conduct to an output terminal so that the voltage with which the capacitor is charged is output as a negative voltage, at least one of the switching device that is kept on while the capacitor is being charged so as to apply the reference voltage to the lower-potential terminal of the capacitor and the switching device that is kept on while the negative voltage is being output so as to make the lower-potential terminal of the capacitor conduct to the output terminal is a depletion-type transistor. It is advisable that the switching devices be formed on a well that is electrically separated from a substrate.

More specifically, according to the present invention, in a negative voltage output charge pump circuit provided with a first switching device connected between an input terminal, to which a positive voltage relative to a reference voltage is applied, and one end of a first capacitor, a second switching device connected between a reference terminal, to which the reference voltage is applied, and the other end of the first capacitor, a third switching device connected between that other end of the first capacitor and a point between one end of a second capacitor and an output terminal, from which a negative voltage is output, and a fourth switching device connected between that one end of the first capacitor and a point between the other end of the second capacitor and the reference terminal, wherein the first capacitor is charged with the positive voltage when the first and second switching devices are on and the third and fourth switching devices are off and wherein the voltage with which the first capacitor is charged is output as the negative voltage from the output terminal when the first and second switching devices are off and the third and fourth switching devices are on, preferably, the first switching device is an enhancement-type PMOS transistor, at least one of the second and third switching devices is a depletion-type PMOS transistor, and the fourth switching device is an enhancement-type NMOS transistor. It is advisable that the first, second, and third switching devices be formed on an n-type well that is electrically separated from a p-type substrate.

With this configuration, it is possible to realize a negative voltage output charge pump circuit that is free from malfunctioning caused by a parasitic device, that operates with low loss, and that can be produced at low costs.

In the negative voltage output charge pump circuit configured as described above, the switching devices may be turned on and off by a control circuit that, to start charging the first capacitor, turns the third and forth switching devices off and then a predetermined period of time thereafter turns the first and second switching devices on and that, to start outputting the negative voltage, turns the first and second switching device off and then a predetermined period of time thereafter turns the third and fourth switching devices on.

With this configuration, it is possible to prevent all the switching devices from being turned on simultaneously when they are turned on or off, and thereby improve the stability of operation.

What is claimed is:

1. A negative voltage output charge pump circuit comprising:

a capacitor that, while being charged, receives, at one end thereof, a reference voltage and receives, at another end thereof, a positive voltage relative to the reference voltage and that, while being discharged, has said another end thereof conducting to the reference voltage and has said one end thereof conducting to an output terminal;

a first switching device that is kept on while the capacitor is being charged so as to apply the reference voltage to said one end of the capacitor; and a second switching device that is kept on while the capacitor is being discharged so as to make said one end of the capacitor conduct to the output terminal, wherein at least one of the first and second switching devices is of a depletion type, wherein the switching devices are formed on a well that is electrically separated from a substrate.

2. A negative voltage output charge pump circuit comprising:

first and second capacitors that are individually charged with and discharged of electric charge;

a reference terminal to which a reference voltage is applied;

an input terminal to which a positive voltage relative to the reference voltage is applied;

an output terminal from which a negative voltage relative to the reference voltage is output;

a first switching device connected between the input terminal and one end of the first capacitor;

a second switching device connected between the reference terminal and another end of the first capacitor;

a third switching device connected between said another end of the first capacitor and a point between one end of the second capacitor and the output terminal; and a fourth switching device connected between said one end of the first capacitor and a point between another end of the second capacitor and the reference terminal, wherein the first switching device is an enhancement-type PMOS transistor, at least one of the second and third switching devices is a depletion-type PMOS transistor, and the fourth switching device is an enhancement-type NMOS transistor, the first capacitor being charged with the positive voltage when the first and second switching devices are on and the third and fourth switching devices are off, the voltage with which the first capacitor is charged being output as the negative voltage from the output terminal when the first and second switching devices are off and the third and fourth switching devices are on.

3. The negative voltage output charge pump circuit according to claim 2, wherein the first, second, and third switching devices are formed on an n-type well that is electrically separated from a p-type substrate.

4. The negative voltage output charge pump circuit according to claim 2, wherein the switching devices are turned on and off by a control circuit, which, to start charging the first capacitor, turns the third and forth switching devices off and then a predetermined period of time thereafter turns the first and second switching devices on and which, to start outputting the negative voltage, turns the first and second switching device off and then a predetermined period of time thereafter turns the third and fourth switching devices on.

5. The negative voltage output charge pump circuit according to claim 4, wherein the control circuit comprises:

an inverter circuit that inverts a signal fed thereto; and a delay circuit that delays a signal fed thereto, wherein a single control signal is split into two signals, of which one is inverted by the inverter circuit and delayed by the delay circuit so that a predetermined delay is produced between the two split control signals.

6. The negative voltage output charge pump circuit according to claim 3, wherein the switching devices are turned on and off by a control circuit, which, to start charging the first capacitor, turns the third and forth switching devices off and then a predetermined period of time thereafter turns the first and second switching devices on and which, to start outputting the negative voltage, turns the first and second switching device off and then a predetermined period of time thereafter turns the third and fourth switching devices on.

7. The negative voltage output charge pump circuit according to claim 6, wherein the control circuit comprises:

an inverter circuit that inverts a signal fed thereto; and a delay circuit that delays a signal fed thereto, wherein a single control signal is split into two signals, of which one is inverted by the inverter circuit and delayed by the delay circuit so that a predetermined delay is produced between the two split control signals.

8. A method for providing a negative voltage output charge pump, comprising:

charging a capacitor that receives, at one end thereof, a reference voltage and receives, at another end thereof, a positive voltage relative to the reference voltage, and while discharging said capacitor, having said another end thereof conducting to the reference voltage and having said one end thereof conducting to an output terminal;

keeping on a first switching device while said capacitor is being charged so as to apply the reference voltage to said one end of the capacitor; and keeping on a second switching device while said capacitor is being discharged so as to make said one end of the capacitor conduct to the output terminal, wherein at least one of the first and second switching devices is of a depletion type, wherein forming the switching devices on a well that is electrically separated from a substrate.

9. A method for providing a negative voltage output charge pump, comprising:

individually charging first and second capacitors with and discharging of electric charge;

applying a reference voltage to a reference terminal;

applying a positive voltage relative to the reference voltage to an input terminal;

outputting a negative voltage relative to the reference voltage from an output terminal;

connecting a first switching device between the input terminal and one end of the first capacitor;

connecting a second switching device between the reference terminal and another end of the first capacitor;

connecting a third switching device between said another end of the first capacitor and a point between one end of the second capacitor and the output terminal; and connecting a fourth switching device between said one end of the first capacitor and a point between another end of the second capacitor and the reference terminal, wherein the first switching device is an enhancement-type PMOS transistor, at least one of the second and third switching devices is a depletion-type PMOS transistor, and the fourth switching device is an enhancement-type NMOS transistor, charging the first capacitor with the positive voltage when the first and second switching devices are on and the third and fourth switching devices are off, outputting the voltage with which the first capacitor is charged as the negative voltage from the output terminal when the first and second switching devices are off and the third and fourth switching devices are on.

\* \* \* \* \*